(12) United States Patent
Kimura et al.

(10) Patent No.: US 11,428,522 B2
(45) Date of Patent: Aug. 30, 2022

(54) DISTANCE MEASURING DEVICE, DISTANCE MEASURING METHOD, AND NON-TRANSITORY COMPUTER-READABLE STORAGE MEDIUM FOR STORING PROGRAM

(71) Applicant: FUJITSU LIMITED, Kawasaki (JP)

(72) Inventors: Yoshie Kimura, Kawasaki (JP); Atsunori Moteki, Chofu (JP); Taichi Murase, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 937 days.

(21) Appl. No.: 16/211,650

(22) Filed: Dec. 6, 2018

(65) Prior Publication Data
US 2019/0178633 A1   Jun. 13, 2019

(30) Foreign Application Priority Data
Dec. 7, 2017   (JP) .............................. JP2017-235049

(51) Int. Cl.
*G01B 11/22* (2006.01)
*G01B 11/25* (2006.01)
(Continued)

(52) U.S. Cl.
CPC ............ *G01B 11/22* (2013.01); *G01B 11/026* (2013.01); *G01B 11/2518* (2013.01);
(Continued)

(58) Field of Classification Search
CPC ... G01B 11/026; G01B 11/22; G01B 11/2518; G01S 17/08; G01S 17/86; G01S 17/89;
(Continued)

(56) References Cited

U.S. PATENT DOCUMENTS

2011/0050854 A1   3/2011   Kanamori et al.
2011/0187820 A1   8/2011   Gilboa et al.
(Continued)

FOREIGN PATENT DOCUMENTS

JP   2013-044597   3/2013
JP   2013-519155   5/2013
(Continued)

OTHER PUBLICATIONS

Seungkyu Lee, "Time-of-Flight Depth Camera Motion Blur Detection and Deblurring", IEEE Signal Processing Letters, vol. 21, No. 6, pp. 663-666, Jun. 2014 (4 pages).
(Continued)

*Primary Examiner* — Yuqing Xiao
*Assistant Examiner* — Amir J Askarian
(74) *Attorney, Agent, or Firm* — Fujitsu Patent Center

(57) ABSTRACT

A distance measuring device is configured to: obtain a first distance image acquired from a time of flight (TOF) sensor and a polarized image generated by calculating a degree of polarization for each pixel based on a plurality of images acquired from a plurality of cameras that receives linearly polarized light with different polarization directions; and execute a process for calculating reliability according to a difference between a time of measuring a distance and a time of photographing the plurality of images for each pixel of the first distance image, and execute a process for calculating a distance from the TOF sensor to a subject for each pixel using a second distance image calculated by weighting the reliability to a distance of each pixel of the first distance image, and a third distance image calculated by estimating a distance of each pixel based on the polarized image.

18 Claims, 12 Drawing Sheets

(51) Int. Cl.
*G01B 11/02* (2006.01)
*H04N 5/369* (2011.01)
*G01S 17/08* (2006.01)
*G01S 17/89* (2020.01)

(52) U.S. Cl.
CPC .............. *G01S 17/08* (2013.01); *G01S 17/89* (2013.01); *H04N 5/36965* (2018.08)

(58) Field of Classification Search
CPC ........ G01S 7/499; G01S 17/88; G01S 7/4814; G01S 17/10; G01S 17/34; G01S 17/42; G01S 17/58; G01S 17/894; G01S 17/931; G01S 7/481; G01S 7/4812; G01S 7/4815; G01S 7/4816; G01S 7/483; G01S 7/4972; H04N 5/36965; H04N 13/207; H04N 13/271; H04N 13/344; H04N 13/383; G01C 13/008; G02B 2027/0138; G02B 2027/014; G02B 23/2461; G02B 23/2469; G02B 23/26; G02B 26/004; G02B 26/08; G02B 26/10; G02B 27/017; G02B 27/126; G02B 27/283; G06T 7/521; G02F 1/13471; G02F 1/1393; G02F 1/292; G02F 1/33; G02F 2201/305; G05D 1/0088; G05D 2201/0213; B60W 60/001
See application file for complete search history.

(56) References Cited

U.S. PATENT DOCUMENTS

| | | |
|---|---|---|
| 2014/0363073 A1 | 12/2014 | Shirakyan et al. |
| 2015/0261184 A1 | 9/2015 | Mannion et al. |
| 2016/0261844 A1 | 9/2016 | Kadambi et al. |
| 2017/0184399 A1* | 6/2017 | Thayer ................ G01S 17/89 |
| 2019/0075281 A1* | 3/2019 | Hall ..................... G01S 7/499 |
| 2019/0129037 A1* | 5/2019 | Fujita .................... A61B 1/07 |
| 2020/0231176 A1* | 7/2020 | Motoyama .......... B60W 60/001 |

FOREIGN PATENT DOCUMENTS

| | | |
|---|---|---|
| JP | 2015-176600 | 10/2015 |
| JP | 2016-529584 | 9/2016 |
| WO | 2010/073547 | 7/2010 |
| WO | WO-2018061508 A1 * | 4/2018 |

OTHER PUBLICATIONS

D. Miyazaki et al., "A Method to Estimate Surface Shape of Transparent Objects by Using Polarization Raytracing Method", Transactions of the Institute of Electronics, Information and Communication Engineers D-ll, vol. J88-DII, No. 8, Aug. 2005, pp. 1432-1439, with partial English translation.

* cited by examiner

FIG. 6

| PIXEL NUMBER | X | Y | Z |
|---|---|---|---|
| 1 | 130 | 140 | 150 |
| 2 | 180 | 140 | 160 |
| ... | ... | ... | ... |
| N | 560 | 290 | 130 |

111a

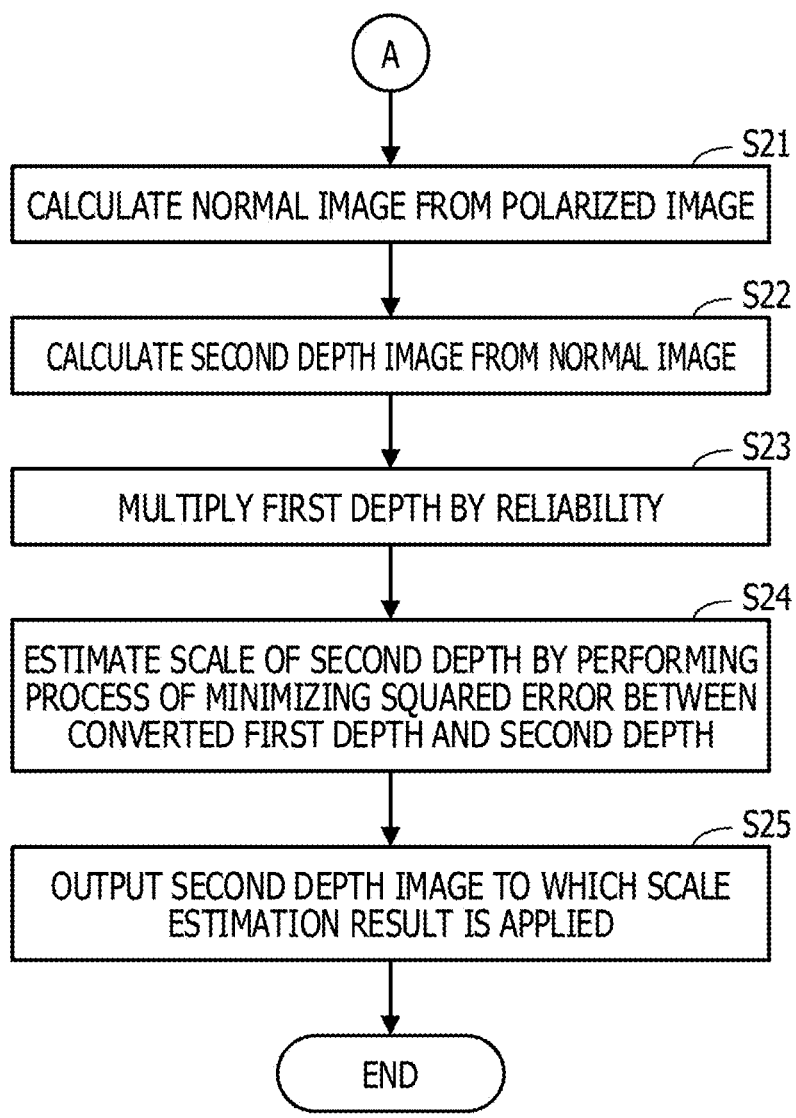

DISTANCE MEASURING DEVICE, DISTANCE MEASURING METHOD, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2017-235049, filed on Dec. 7, 2017, the entire contents of which are incorporated herein by reference.

FIELD

The embodiments discussed herein are related to a distance measuring device, a distance measuring method, and a non-transitory computer-readable storage medium for storing a program.

BACKGROUND

One of the ranging techniques for measuring the distance to the object is a time of flight (TOF) method. In the TOF method, the distance to the object is measured based on the round-trip time taken for a light beam for distance measurement emitted to the object to reach the object, be reflected, and return.

Another ranging technique has also been offered in which a degree of polarization is calculated based on an image obtained by a camera receiving linearly polarized light having different polarization directions, and the distance to the object is measured based on the degree of polarization.

Still another ranging technique has also been offered in which both the distance image acquired from a distance (depth) sensor, and the polarized image including the degree of polarization obtained from the camera as described above are used to measure the distance with high accuracy, compared with the case where a distance sensor alone is used.

Examples of the related art include Japanese Laid-open Patent Publication No. 2013-044597, U.S. Patent Application Publication No. 2016/0261844, Seungkyu Lee, "Time-of-Flight Depth Camera MotionBlur Detection and Deblurring", IEEE SIGNAL PROCESSING LETTERS, VOL. 21, NO. 6, JUNE 2014, and Daisuke Miyazaki and Katsushi Ikeuchi, "A Method to Estimate Surface Shape of Transparent Objects by Using Polarization Raytracing Method", Transactions of the Institute of Electronics, Information and Communication Engineers D-II, Vol. J88-DII, No. 8, August 2005, pp. 1432-1439.

SUMMARY

According to an aspect of the embodiments, a distance measuring device includes: a memory configured to store a first distance image acquired from a time of flight (TOF) sensor and a polarized image generated by calculating a degree of polarization for each pixel based on a plurality of images acquired from a plurality of cameras that receives linearly polarized light with different polarization directions; and a processor coupled to the memory and configured to execute a reliability acquisition process that includes calculating reliability according to a difference between a time of measuring a distance and a time of photographing the plurality of images for each pixel of the first distance image, and execute a distance acquisition process that includes calculating an output value of a distance from the TOF sensor to a subject for each pixel using a second distance image calculated by weighting the reliability to a distance of each pixel of the first distance image, and a third distance image calculated by estimating a distance of each pixel based on the polarized image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of a data structure of a first depth image;

FIG. 12 is a flowchart (part 2) illustrating an example of the processing procedure of the shape measuring device.

DESCRIPTION OF EMBODIMENTS

A line scan type TOF sensor is often used to measure a distance. The line scan type TOF sensor emits a light beam for distance measurement as an irradiation pattern extending in a predetermined first direction, and receives the reflected light of the light beam while sequentially moving the irradiation pattern in a second direction orthogonal to the first direction.

In such a line scan type TOF sensor, the times at which light is emitted to an object by using the irradiation pattern are different depending on the positions with respect to the first direction. For this reason, when the object to be moved is set as a distance measurement target, the shape of the image of the object captured in the TOF sensor may be distorted. When the shape of such an image is distorted, there is a problem that the distance measurement accuracy deteriorates.

In one aspect, the techniques disclosed in the embodiments intend to provide a distance measuring device, a distance measuring method, and a distance measuring program which are capable of measuring a distance to a moving object with high accuracy.

Hereinafter, embodiments discussed herein will be described with reference to the drawings.

First Embodiment

Figure 1:
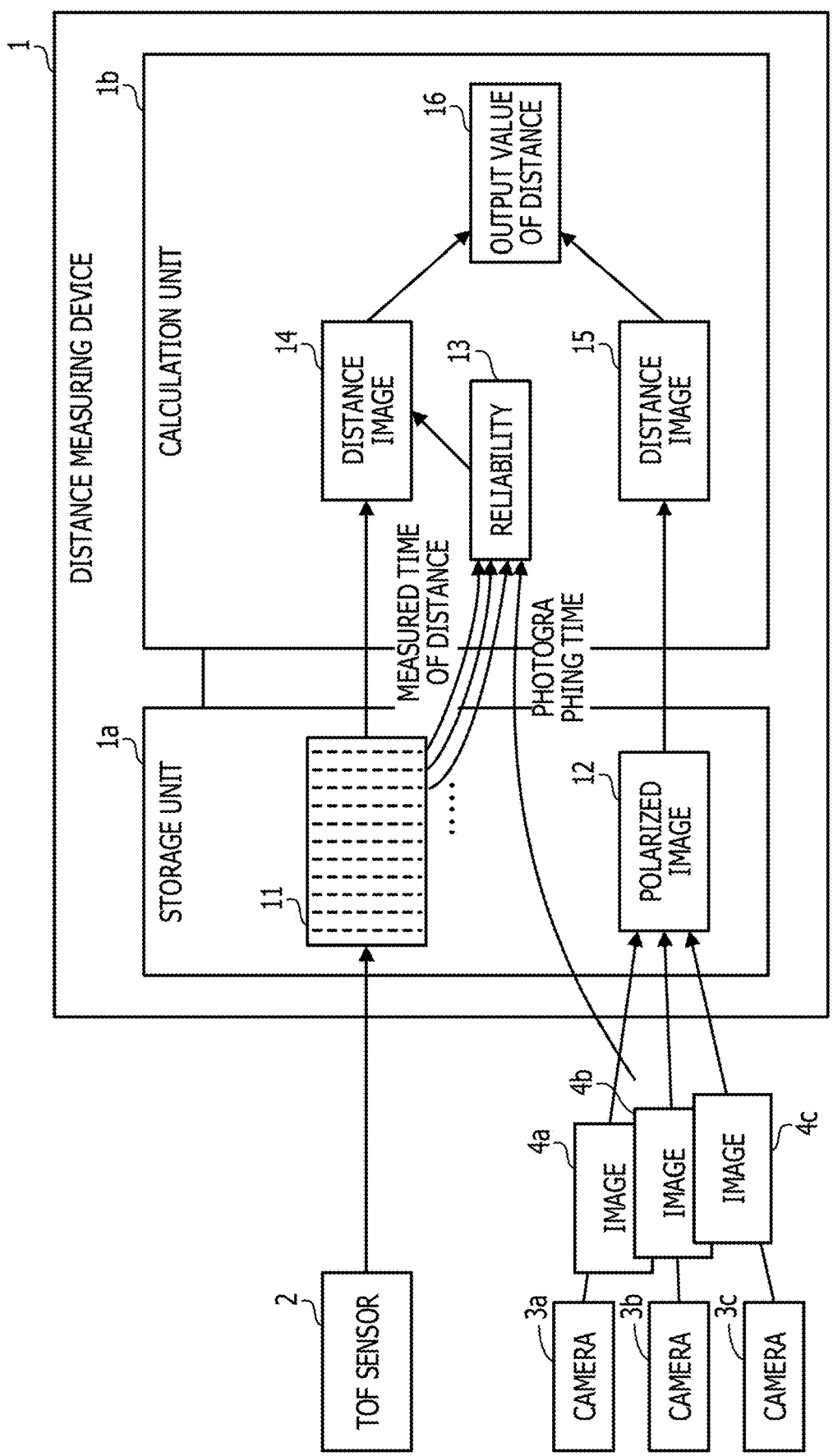
FIG. 1 is a diagram illustrating an example of a configuration of and an example of a process of a distance measuring device according to a first embodiment.

FIG. 1 is a diagram illustrating an example of a configuration of and an example of a process of the distance measuring device according to the first embodiment. A distance measuring device 1 illustrated in FIG. 1 measures the distance between a TOF sensor 2 and an object (not illustrated) to be a distance measurement target for each pixel of the image of the object using the measurement result by the TOF sensor 2 and images captured by a plurality of cameras. The TOF sensor 2 emits a light beam for distance measurement to a subject, and measures the distance (depth) to the subject based on the round trip time from the emission of the light to the reception of the reflected light.

The distance measuring device 1 includes a storage unit 1a and a calculation unit 1b. The storage unit 1a is constructed, for example, as a storage area of a storage device (not illustrated) included in the distance measuring device 1. The calculation unit 1b is provided, for example, as a processor (not illustrated) included in the distance measuring device 1.

In the storage unit 1a stores a distance image 11 (first distance image) acquired from the TOF sensor 2, and a polarized image 12 generated based on a plurality of images acquired from a plurality of cameras. Although in the present embodiment, as an example, three cameras 3a to 3c are used for generating the polarized image 12, four or more cameras may be used.

The cameras 3a, 3b, and 3c receive linearly polarized light having different polarization directions, thereby outputting images 4a, 4b, and 4c, respectively. For example, the camera 3a receives linearly polarized light of 0°, the camera 3b receives linearly polarized light of 45°, and the camera 3c receives linearly polarized light of 90°. The polarized image 12 is generated by calculating the degree of polarization for each pixel based on the images 4a to 4c.

The cameras 3a to 3c capture the images 4a to 4c at the same photographing time. "The same photographing time" means that the exposure period is the same for the entire images 4a to 4c. On the other hand, since the TOF sensor 2 has a structure that may not receive the reflected light of the distance measuring light beam at the same time with respect to the entire distance image 11, the times of measuring the distance are partially different for the distance image 11. For example, when the line scan type is used, the TOF sensor 2 emits a light beam for distance measurement by using an irradiation pattern extending in a predetermined first direction (for example, a longitudinal direction). The TOF sensor 2 receives reflected light of the light beam while sequentially moves the irradiation pattern in a second direction (for example, a lateral direction) orthogonal to the first direction. In this case, the reception times of reflected light are different depending on the positions on the distance image 11 in the second direction, the times of measuring the distance are different depending on the positions in the second direction.

The calculation unit 1b calculates reliability 13 corresponding to the difference between the time of measuring the distance and the photographing time by the cameras 3a to 3c for each pixel of the distance image 11. In this calculation, for example, the closer the time of measuring the distance is to the photographing time, the higher value the value of the reliability 13 is set to. The calculation unit 1b calculates a distance image 14 (second distance image) by weighting the reliability 13 corresponding to each pixel of the distance image 11.

The calculation unit 1b calculates a distance image 15 (third distance image) by estimating the distance for each pixel based on the polarized image 12. The calculation unit 1b calculates a normal image with which normal information is associated for each pixel, for example, based on the polarized image 12, and calculates the distance image 15 based on this normal image.

The calculation unit 1b calculates an output value 16 of the distance from the TOF sensor 2 to the subject for each pixel using the distance image 14 and the distance image 15. As described above, in the distance image 11, the times of measuring the distance are different depending on the positions of the pixels. For this reason, when the object to be moved is set as a distance measurement target, the shape of the image of the object photographed in the distance image 11 may be distorted. When the shape of the image is distorted, the distance measurement accuracy deteriorates.

On the other hand, the time of photographing the images 4a to 4c by the cameras 3a to 3c is the same, the exposure period is the same for the entire images 4a to 4c. Therefore, in the distance image 15 calculated from the images 4a to 4c, distortion of the shape of the image caused by the movement of the object as described above does not occur. Therefore, the calculation unit 1b may accurately calculate the output value 16 of the distance by using not only the distance image 11 in which distortion of the shape of the image may occur but also the distance image 15 in which distortion of the shape of the image does not occur.

When calculating the output value 16 of the distance, the calculation unit 1b uses the distance image 14 obtained by converting the distance image 11 using the reliability 13 instead of using the distance image 11 as it is. The reliability 13 is calculated depending on the difference between the time of measuring the distance for each pixel of the distance image 11, and the time of photographing the images 4a to 4c. Therefore, when the output value 16 of the distance is calculated, the distance image 14 converted using the reliability 13 is used, so that the extent to which the measured time and the measured distance is reflected in the process of calculating the output value 16 of the distance is high in the pixel in which the time of measuring the distance is close to the photographing time and the accuracy of the measured distance is high. As a result, when the object moves, it is possible to reduce the influence of the distortion of the shape of the image caused by the movement on the accuracy of distance measurement, thereby improving the accuracy of distance measurement.

Second Embodiment

Figure 2:
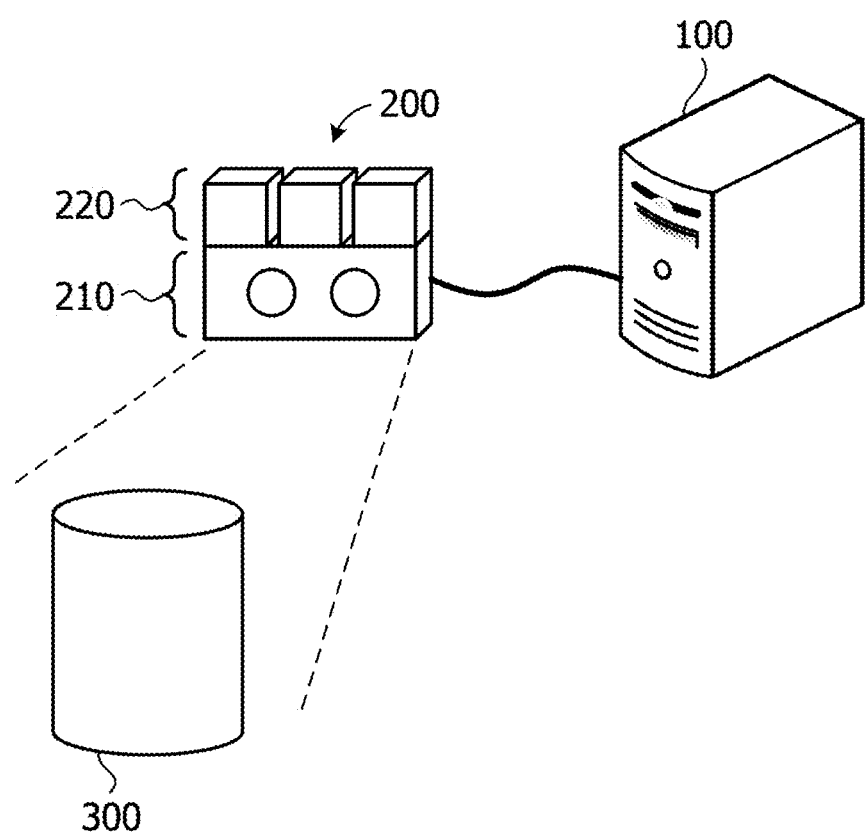
FIG. 2 is a diagram illustrating an example of a configuration of a shape measuring system according to a second embodiment.

FIG. 2 is a diagram illustrating an example of a configuration of a shape measuring system according to the second embodiment. The shape measuring system illustrated in FIG. 2 includes a shape measuring device 100 and a sensor unit 200.

The shape measuring device 100 acquires an image of a subject from the sensor unit 200, and measures the depth (distance) between the subject photographed in the acquired image and the sensor unit 200 for each pixel on the image. For example, when an object 300 to be measured is photographed in the image, the shape measuring device 100 measures the depth for each pixel of the image with respect to the object 300 photographed in the image. As a result, the shape measuring device 100 may measure the three-dimensional shape of the object 300.

The sensor unit 200 includes a TOF sensor 210 and a camera unit 220. The TOF sensor 210 calculates the depth of the subject using the TOF method. For example, the TOF sensor 210 calculates the depth of the subject based on the round trip time of laser light taken for laser light emitted from the TOF sensor 210 to reach the subject, be reflected, and return. Hereinafter, the depth calculated by the TOF sensor 210 is referred to as a first depth. The TOF sensor 210 outputs to the shape measuring device 100 the first depth image obtained by plotting the depth for each pixel on the image.

On the other hand, the camera unit 220 simultaneously captures a plurality of camera images obtained by receiving components of linearly polarized light having different polarization directions out of the light from the subject, and outputs these camera images to the shape measuring device 100. The shape measuring device 100 may acquire a luminance image as each camera image. For this purpose, the camera unit 220 may be configured to capture a luminance image, alternatively, the camera unit 220 may capture a color image, and the shape measuring device 100 may convert the color image into a luminance image.

The shape measuring device 100 acquires the first depth image based on the first depth output from the TOF sensor 210. In addition, the shape measuring device 100 calculates the polarized image based on the camera image output from the camera unit 220, and then calculates the depth of the subject based on the calculated polarized image. Hereinafter, the depth obtained from the polarized image based on the camera image is referred to as a second depth. As will be described later, the shape measuring device 100 uses both the first depth and the second depth, thereby calculating the depth with high accuracy with reduced influence of the distortion of the shape of the object 300 appearing in the measurement result of the first depth.

Figure 3:
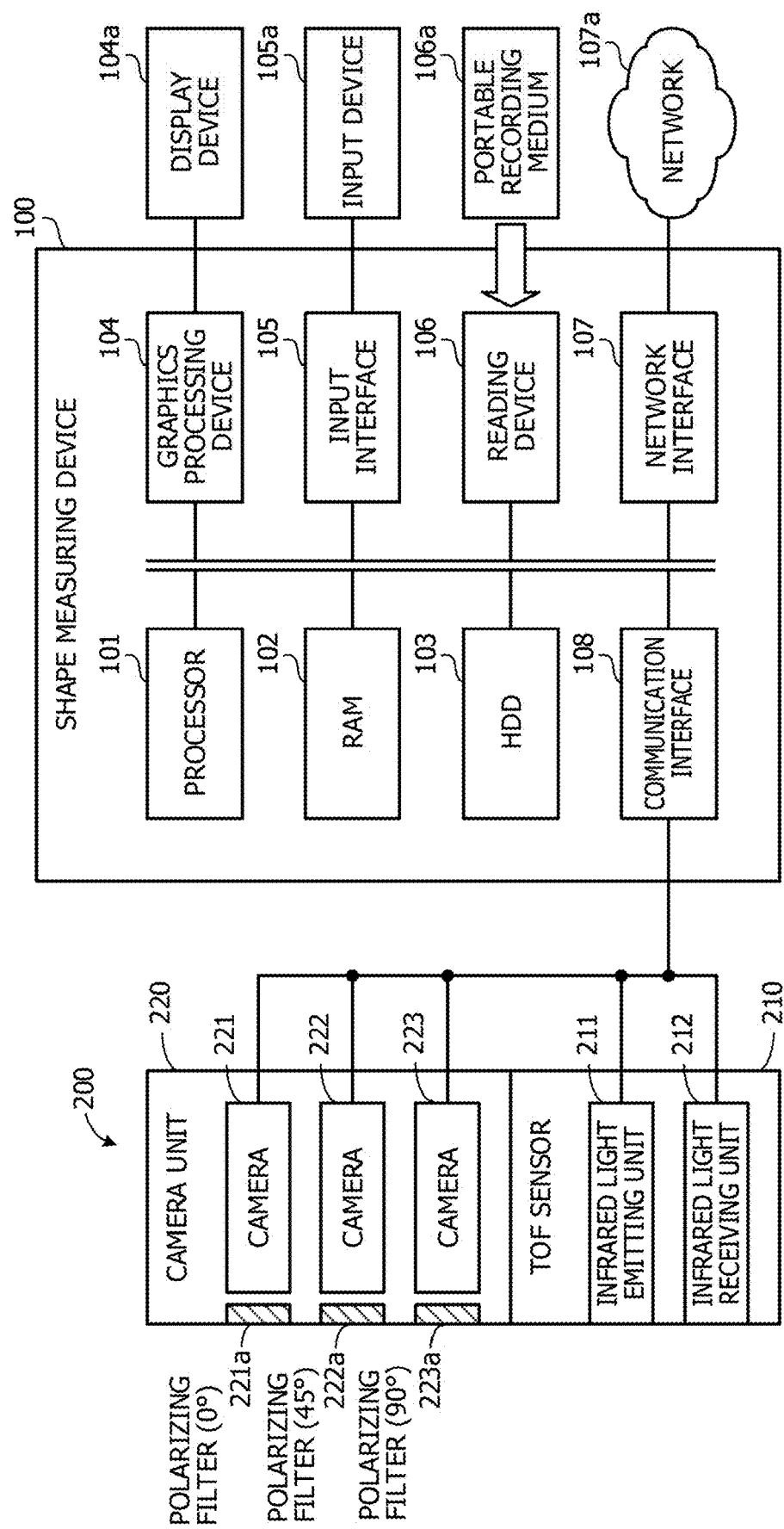
FIG. 3 is a diagram illustrating an example of a hardware configuration of a shape measuring device and a sensor unit.

FIG. 3 is a diagram illustrating an example of a hardware configuration of the shape measuring device and the sensor unit. First, the shape measuring device 100 is provided, for example, as a computer as illustrated in FIG. 3. The shape measuring device 100 illustrated in FIG. 3 includes a processor 101, a random access memory (RAM) 102, a hard disk drive (HDD) 103, a graphics processing device 104, an input interface 105, a reading device 106, a network interface 107 and a communication interface 108.

The processor 101 controls the entire shape measuring device 100. The processor 101, for example, a central processing unit (CPU), a micro processing unit (MPU), a digital signal processor (DSP), an application specific integrated circuit (ASIC) or a programmable logic device (PLD). The processor 101 may be a combination of two or more of the CPU, the MPU, the DSP, the ASIC, and the PLD.

The RAM 102 is used as a main storage device of the shape measuring device 100. The RAM 102 temporarily stores at least part of an operating system (OS) program and an application program both of which are executed by the processor 101. The RAM 102 stores various data which is used for processing by the processor 101.

The HDD 103 is used as an auxiliary storage device of the shape measuring device 100. The HDD 103 stores the OS program, the application program, and various data. As the auxiliary storage device, another type of nonvolatile storage device such as a solid state drive (SSD) may also be used.

A display device 104a is connected to the graphics processing device 104. The graphics processing device 104 causes the display device 104a displays an image according to a command from the processor 101. Examples of the display device include a liquid crystal display and an organic electroluminescence (EL) display.

An input device 105a is connected to the input interface 105. The input interface 105 transmits a signal output from the input device 105a to the processor 101. Examples of the input device 105a include a keyboard and a pointing device. Examples of the pointing device include a mouse, a touch panel, a tablet, a touch pad, and a track ball.

A portable recording medium 106a is removably attached to the reading device 106. The reading device 106 reads the data recorded on the portable recording medium 106a and transmits the read data to the processor 101. Examples of the portable recording medium 106a include an optical disk, a magneto-optical disk, and a semiconductor memory.

The network interface 107 transmits and receives data to and from other devices via a network 107a. The communication interface 108 transmits and receives data to and from the sensor unit 200.

The hardware configuration as described above may implement the processing function of the shape measuring device 100. The TOF sensor 210 of the sensor unit 200 includes an infrared light emitting unit 211 and an infrared light receiving unit 212. The infrared light emitting unit 211 emits an infrared laser to the subject. The infrared light receiving unit 212 receives the reflected light of the infrared laser emitted from the infrared light emitting unit 211. The TOF sensor 210 calculates the depth of the subject by measuring the round trip time taken for the infrared laser emitted from the infrared light emitting unit 211 to reach the subject, be reflected, and return, and multiplying the measured round trip time by the light speed. The TOF sensor 210 outputs to the shape measuring device 100 the first depth image obtained by plotting the depth for each pixel on the image.

The camera unit 220 of the sensor unit includes cameras 221 to 223 and polarizing filters 221a to 223a. Each of the cameras 221 to 223, for example, photographs a red/blue/green (RGB) color image. The polarizing filters 221a to 223a are linearly polarizing plates that transmit linearly polarized light having a specific polarization direction among the incident light.

A polarizing filter 221a is disposed with a rotation angle of 0° around the optical axis of the camera 221 on the imaging surface of the camera 221, and the camera 221 captures an image via the polarizing filter 221a. The polarizing filter 222a is disposed with a rotation angle of 45° around the optical axis of the camera 222 on the imaging surface of the camera 222, and the camera 222 captures an image via the polarizing filter 222a. The polarizing filter 223a is disposed with a rotation angle of 90° around the optical axis of the camera 223 on the imaging surface of the camera 223, and the camera 223 captures an image via the polarizing filter 223a. As a result, the camera 221 outputs a camera image obtained by receiving linearly polarized light of 0°, the camera 222 outputs a camera image obtained by receiving linearly polarized light of 45°, an the camera 223 outputs a camera image obtained by receiving linearly polarized light of 90°.

Although not illustrated, each of the cameras 221 to 223 has a global shutter. The cameras 221 to 223 open and close each global shutter synchronously, so that it is possible to output a camera image shot at the same photographing time (for example, exposed in the same exposure period).

Figure 4:
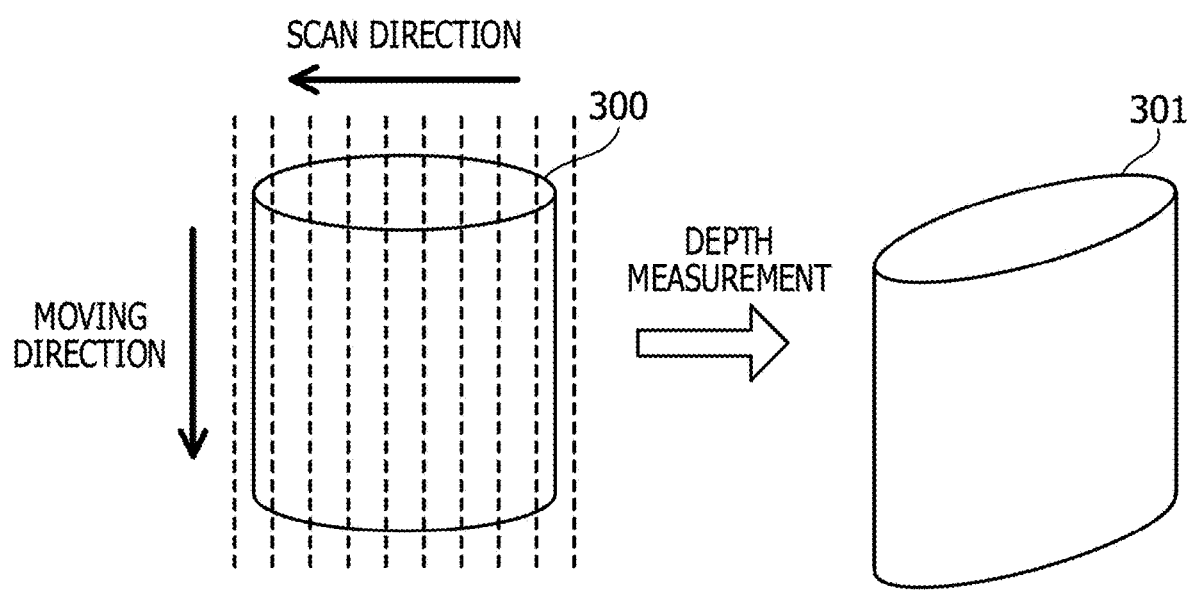
FIG. 4 is a diagram for explaining a problem with a depth measurement by a TOF sensor.

Next, FIG. 4 is a diagram for explaining the problem with a depth measurement by the TOF sensor. The infrared light emitting unit 211 of the TOF sensor 210 emits the infrared laser with a linear irradiation pattern, and gradually shifts the irradiation pattern, thereby emitting the infrared laser over the entire depth measurement range. In the example illustrated on the left side of FIG. 4, the linear irradiation pattern is indicated by a broken line. In this example, the irradiation pattern has a linear shape extending in the vertical direction, and irradiation is performed such that the irradiation pattern is gradually shifted from right to left. Hereinafter, the shift direction of the irradiation pattern is referred to as "a scan direction".

Since the infrared laser emits light in this way, in the first depth image output from the TOF sensor 210, the scan times (reception times of reflected light of the infrared laser) are different depending on the positions with respect to the scan direction. This means that, for example, when measuring the three-dimensional shape of the moving object 300, the measurement result is inaccurate.

FIG. 4 illustrates a case where the scanning direction is from right to left, and the object 300 moves from the top to the bottom. In this case, as illustrated on the right side of FIG. 4, an image 301 of the object 300 photographed in the first depth image is shaped such that its left side is shifted downward. In this way, when the object 300 moves, the shape of the image 301 of the object 300 may be distorted. Such a distorted shape of the image 301 has a problem that the measured first depth is inaccurate.

An increase in the scanning speed of the TOF sensor 210 may reduce the occurrence of distortion as described above, and improve the measurement accuracy of the first depth. However, since the scan speed and the number of scans in one image (the irradiation number of the irradiation pattern with respect to the scan direction) are in a trade-off relationship, the number of scans will decrease when the scan speed is increased. As a result, there is a problem that the resolution of the first depth image is lower, whereby the obtained three-dimensional shape is rough.

In order to cope with such a problem, the shape measuring device 100 of the present embodiment calculates the depth of the subject using the second depth image in addition to the first depth image. The second depth image is obtained from the calculated polarized image based on the camera image acquired from the camera unit 220. As described above, the camera unit 220 photographs at the same time a plurality of camera images obtained by receiving linearly polarized light having different polarization directions by using the global shutter. Therefore, in the polarized image obtained from such a camera image, the shape of the image 301 of the object 300 is not distorted. Utilizing this property, the shape measuring device 100 calculates the depth with high accuracy in which the influence of the distortion of the shape of the image appearing in the first depth image is reduced by using both the first depth image and the second depth image.

Figure 5:
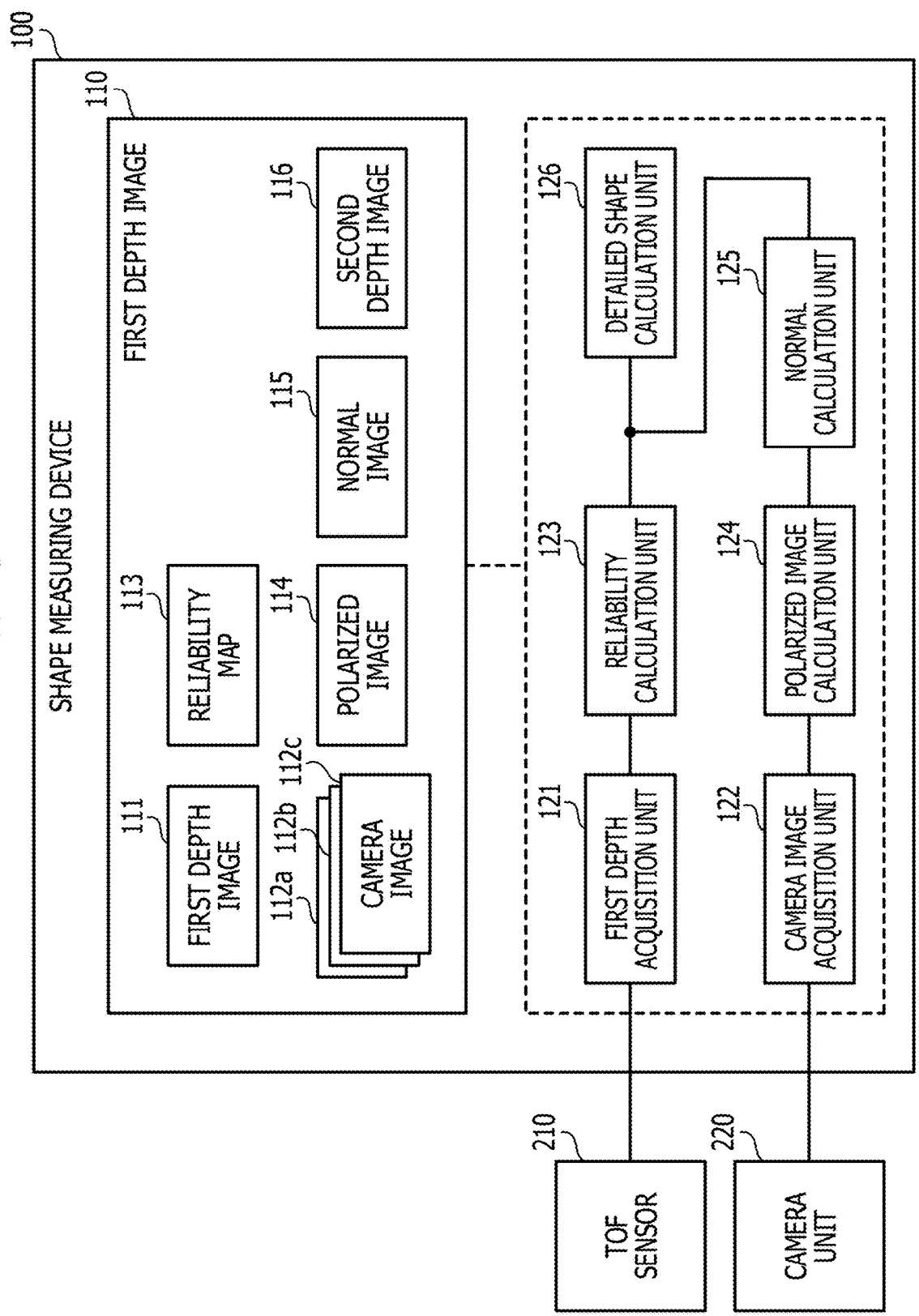
FIG. 5 is a block diagram illustrating an example of a configuration of a processing function of a shape measuring device.

FIG. 5 is a block diagram illustrating an example of a configuration of a processing function of the shape measuring device. The shape measuring device 100 includes a storage unit 110, a first depth acquisition unit 121, a camera image acquisition unit 122, a reliability calculation unit 123, a polarized image calculation unit 124, a normal calculation unit 125 and a detailed shape calculation unit 126.

The storage unit 110 is constructed as a storage area of a storage device, such as the RAM 102 and the HDD 103, which is included in the shape measuring device 100. The storage unit 110 stores a first depth image 111, camera images 112a to 112c, a reliability map 113, a polarized image 114, a normal image 115 and a second depth image 116.

The processing of the first depth acquisition unit 121, the camera image acquisition unit 122, the reliability calculation unit 123, the polarized image calculation unit 124, the normal calculation unit 125 and the detailed shape calculation unit 126 are, for example, implemented by the processor 101 executing a predetermined program.

The first depth acquisition unit 121 acquires the first depth image 111 from the TOF sensor 210, and stores the acquired first depth image 111 in the storage unit 110. The first depth image 111 has a structure in which the measured values of the depth are plotted for each pixel on the image. The acquisition time of the first depth image 111 is added to the data of the first depth image 111.

The camera image acquisition unit 122 acquires camera images 112a, 112b, and 112c photographed by the cameras 221, 222, and 223 of the camera unit 220, respectively, and stores the acquired camera images 112a, 112b, and 112c in the storage unit 110. A photographing time is added to each data of the camera images 112a to 112c. Since the camera images 112a to 112c are photographed at the same time, the photographing time added is also the same.

The reliability calculation unit 123 calculates the reliability for each pixel on the first depth image 111 based on the acquisition time of the first depth image 111, and the time of photographing the camera images 112a to 112c. With respect to the reliability, the closer the scan time is to the time of photographing the camera images 112a to 112c with respect to the aforementioned scan direction in the first depth image 111, the larger the assigned value is. The scan time is converted from the acquisition time of the first depth image 111. The reliability calculation unit 123 generates the reliability map 113 in which the reliability is plotted for each pixel on the first depth image 111, and stores the generated reliability map 113 in the storage unit 110.

The polarized image calculation unit 124 calculates the polarized image 114 based on the camera images 112a to 112c, and stores the calculated polarized image 114 in the storage unit 110. The polarized image 114 has a structure in which the degree of polarization is plotted for each pixel on the image. The degree of polarization is an index indicating how much light is polarized, is a value of 0 or more and 1 or less.

The normal calculation unit 125 calculates the normal information for each pixel on the polarized image 114 based on the polarized image 114. The normal calculation unit 125 generates the normal image 115 in which normal information is plotted for each pixel on the image, and stores the generated normal image 115 in the storage unit 110.

The detailed shape calculation unit 126 estimates the second depth for each pixel of the normal image 115 based on the normal information included in the normal image 115. The detailed shape calculation unit 126 stores in the storage unit 110 the second depth image 116 in which the second depth is plotted for each pixel.

The detailed shape calculation unit 126 multiplies the depth of each pixel of the first depth image 111 by the corresponding reliability included in the reliability map 113, thereby converting the first depth image 111. The depth estimated from the normal image 115 has an unknown scale. The detailed shape calculation unit 126 performs the process of minimizing the squared error between a first depth image converted using reliability and the second depth image 116, thereby estimating the scale of the second depth image 116. The detailed shape calculation unit 126 outputs A second depth image to which the estimated scale is applied as a depth image in which the distortion of the shape of the image is corrected.

<Acquisition of First Depth Image and Camera Image>

Hereinafter, the processing of the shape measuring device 100 will be described in more detail. The first depth acquisition unit 121 acquires the first depth image 111 from the TOF sensor 210, and stores the acquired first depth image 111 in the storage unit 110. The camera image acquisition unit 122 acquires the camera images 112a, 112b, and 112c photographed by the cameras 221, 222, and 223 of the camera unit 220, respectively, and stores the acquired camera images 112a, 112b, and 112c in the storage unit 110.

The camera images 112a to 112c are stored in the storage unit 110 as luminance images. When color images are output from the cameras 221, 222, and 223, the camera image acquisition unit 122 converts the color images output from the cameras 221, 222, and 223 into luminance images, and stores in a storage unit 110 the converted color images as camera images 112a, 112b, and 112c. It is assumed that the camera images 112a to 112c are stored in the storage unit 110 as images having a resolution same as the first depth image 111.

As described above, the cameras 221, 222, and 223 photograph the camera images 112a, 112b, and 112c, respectively, and output them at the same time by using the global shutter. When the data of the acquired camera images 112a to 112c in the storage unit 110 is stored, the camera image acquisition unit 122 adds the simultaneous photographing time to each data.

On the other hand, when storing the data of the acquired first depth image 111 in the storage unit 110, the first depth acquisition unit 121 adds the acquisition time of the first depth image 111 to the data. This acquisition time may be, for example, the time at which the first depth acquisition unit 121 instructs the TOF sensor 210 to output the first depth image 111, the time at which the first depth acquisition unit 121 completes the reception of the first depth image 111, or the like.

The time of photographing the camera images 112a to 112c and the acquisition time of the first depth image 111 are referred to when the reliability calculation unit 123 calculates the reliability. As described with reference to FIG. 4, in the first depth image 111, the scan times differs depending on the positions in the scan direction. The reliability calculation unit 123 may, from the acquisition time of the first depth image 111 as described above, convert the scan time for each position with respect to the scan direction.

The acquisition of the first depth image 111 and the acquisition of the camera images 112a to 112c are performed synchronously. For example, the first depth image 111 and the camera images 112a to 112c are acquired so that the time of photographing the camera images 112a to 112c is included in the scan period of the first depth image 111 (the period from the scan time at the position at one end with respect to the scan direction to the scan time at the position of the other end).

FIG. 6 is a diagram illustrating an example of the data structure of the first depth image. The data of the first depth image 111 is stored in the storage unit 110 as the data of the structure associated with the position in the X-axis direction (horizontal direction) the position in the Y-axis direction (vertical direction), and the position in the Z direction (depth direction) for each pixel. Among them, the position in the Z direction indicates the depth (distance). The data of the first depth image 111 is stored, for example, as a data table 111a as illustrated in FIG. 6. In the data table 111a illustrated in FIG. 6, each position in the X direction, the Y direction, and the Z direction is registered in association with the pixel number of each pixel.

<Calculation of Reliability>

Figure 7:
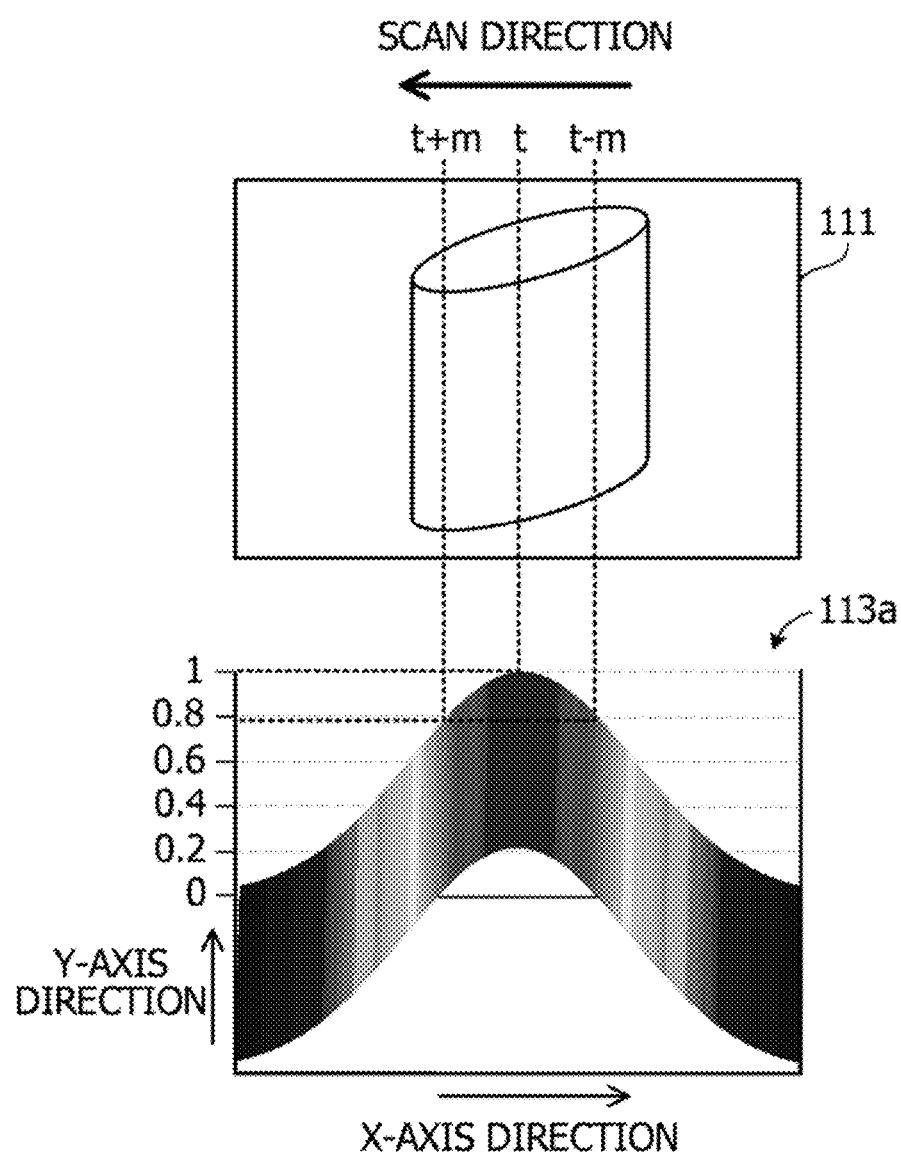
FIG. 7 is a diagram for explaining a calculation of reliability.

Next, a process of calculating the reliability by the reliability calculation unit 123 will be described. FIG. 7 is a diagram for explaining calculation of the reliability. The reliability calculation unit 123 calculates the reliability for each pixel on the first depth image 111 based on the acquisition time of the first depth image 111 and the time of photographing the camera images 112a to 112c.

For example, the reliability calculation unit 123 calculates the scan time for each position with respect to the scan direction in the first depth image 111 based on the acquisition time of the first depth image 111. In the example of the first depth image 111 illustrated in FIG. 7, the scan direction is from right to left. In this case, different scan times are calculated for respective pixel columns having the same horizontal coordinate (for example, pixel columns arranged in parallel in the vertical direction).

Next, the reliability calculation unit 123 calculates the reliability corresponding to the difference between the scan time and the time of photographing the camera images 112a to 112c for each pixel of the first depth image 111. The reliability is calculated as a value of 0 or more and 1 or less. The closer the scanning time is to the photographing time, the higher the value of reliability is. When the scan time coincides with the photographing time, the reliability is set to 1. The reason for this is that it is probable that the closer the scan time is to the photographing time, the higher degree of coincidence the position information of the image obtained at the scan time and the position information of the image in the second depth image 116 calculated based on the camera images 112a to 112c has. Such reliability is used in which the process of minimizing the square error between the first depth image 111 and the second depth image 116 by the detailed shape calculation unit 126 is performed, whereby weighting according to the reliability is performed for the square error for each pixel. As a result, the accuracy of the process of minimizing the squared error may be improved.

A graph 113a in FIG. 7 illustrates an example of the relationship between the respective coordinates in the X-axis direction and the Y-axis direction, and the reliability in the first depth image 111. In this example, the time of photographing the camera images 112a to 112c is t. In this case, reliability is calculated to be 1 for a pixel column whose scan time is t among the pixel columns having the same horizontal coordinate in the first depth image 111. The reliability is calculated to be a value which is smaller than 1 with respect to a pixel column whose scan time is (t−m), and a pixel column whose scan time is (t+m). In the example of FIG. 7, the reliability is calculated to be the same value with respect to these respective pixel columns.

Information indicating the relationship between the differential value between the scan time and the photographing time, and the reliability is prepared in advance, for example, as an expression or a data table, and is stored in the storage unit 110. The reliability calculation unit 123 calculates the reliability corresponding to the differential value between the scan time and the photographing time based on such information.

Through the above procedure, the reliability calculation unit 123 calculates the reliability for each pixel of the first depth image 111. The reliability calculation unit 123 generates the reliability map 113 in which the reliability is plotted for each pixel of the first depth image 111, and stores the generated reliability map 113 in the storage unit 110.

<Calculation of Polarized Image>

Figure 8:
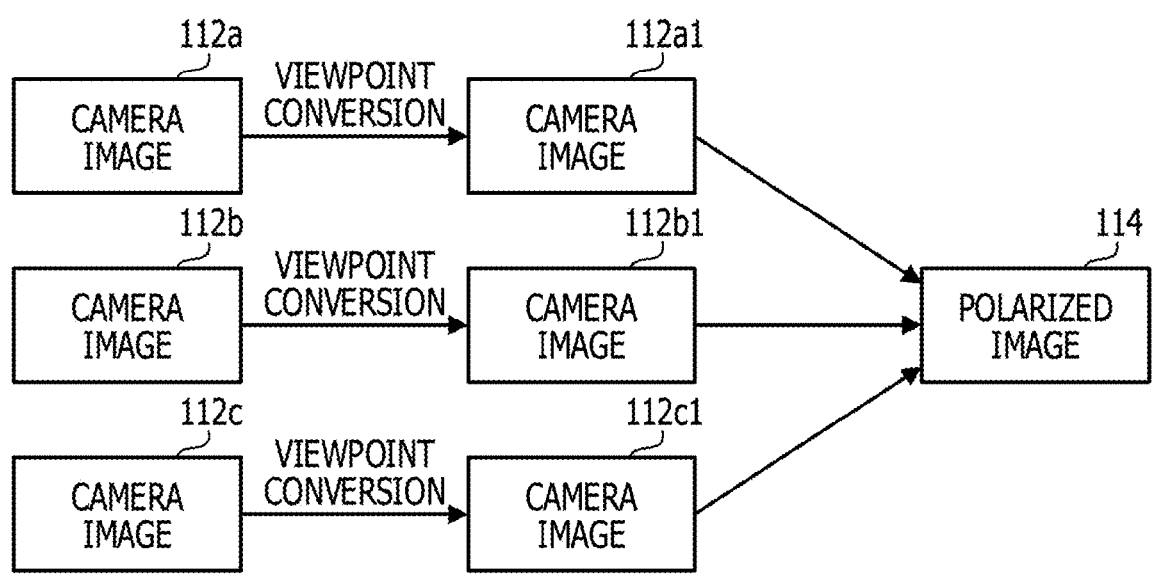
FIG. 8 is a diagram illustrating an outline of a process of calculating a polarized image.

Next, the process of calculating the polarized image 114 by the polarized image calculation unit 124 will be described. FIG. 8 is a diagram illustrating an outline of a process of calculating a polarized image. The polarized image calculation unit 124 performs a viewpoint conversion process for matching the viewpoint to the viewpoint of the first depth image 111 for each of the camera images 112a to 112c. The following preparations are made in order to perform this viewpoint conversion process.

External parameters of the TOF sensor 210 and the cameras 221 to 223 are set based on the positions and orientations of the TOF sensor 210 and the cameras 221 to 223. Internal parameters of the cameras 221 to 223 are set. These parameters are obtained by calibration. A homography matrix for converting the viewpoints of the cameras 221 to 223 to the viewpoint of the TOF sensor 210 is calculated based on these parameters.

The polarized image calculation unit 124 calculates camera images 112a1, 112b1, and 112c1 by converting the camera images 112a, 112b, and 112c using the homography matrix. The camera images 112a1, 112b1, and 112c1 are images obtained when the camera images 112a, 112b, and 112c are photographed in the same direction from the same position as the TOF sensor 210.

Next, the polarized image calculation unit 124 calculates the polarized image 114 using the camera images 112a1 to 112c1 obtained by the conversion. In this calculation process, the following processing is performed for each pixel of the camera images 112a1 to 112c1.

The polarized image calculation unit 124 approximates the luminance value of the m-th pixel in the camera images 112a1 to 112c1 by the cosine curve expressed by the following expression (1).

$$y_m = a_m \cos(\Theta + b_m) + c_m \qquad (1)$$

The polarized image calculation unit 124 obtains the maximum value and the minimum value in the obtained cosine curve, and calculates the degree of polarization of the m-th pixel by the expression of (maximum value/minimum value)/(maximum value+minimum value). As a result, the degree of polarization is calculated as a value of 0 or more and 1 or less.

The polarized image calculation unit 124 calculates the degree of polarization for each pixel according to the above processing procedure. The polarized image calculation unit 124 generates the polarized image 114 in which the degree of polarization is plotted for each pixel, and stores the generated polarized image 114 in the storage unit 110.

The degree of polarization may be calculated from a camera image obtained by using three or more polarizing filters with different rotation angles. In the present embodiment, as an example, although the degree of polarization is calculated based on the three camera images 112a to 112c obtained by using the three polarizing filters 221a to 223a, the degree of polarization may be calculated based on camera images obtained by using four or more polarizing filters.

<Calculation of Normal Information>

Next, the process of calculating the normal information by the normal calculation unit 125 will be described. The normal calculation unit 125 calculates normal information for each pixel on the polarized image 114 based on the polarized image 114. The zenith angle $\theta$ and the azimuth angle $\varphi$ are calculated as normal information.

Figure 9:
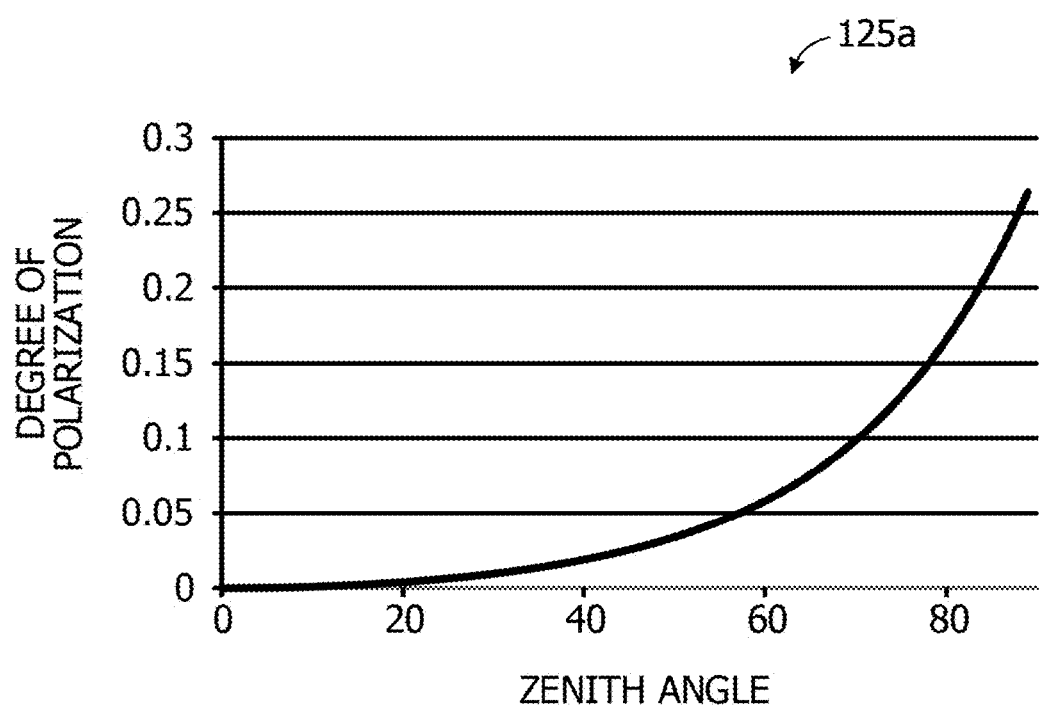
FIG. 9 is a diagram illustrating an example of a relationship between a degree of polarization and a zenith angle.

FIG. 9 is a diagram illustrating an example of the relationship between the degree of polarization and the zenith angle. Assuming that the object 300 is a diffusely reflecting object, the zenith angle $\theta$ is uniquely determined from the degree of polarization. The relationship between the degree of polarization and the zenith angle $\theta$ is, for example, represented by a graph 125a illustrated in FIG. 9. The normal calculation unit 125 calculates the normal calculates the zenith angle $\theta$ for each pixel from the degree of polarization based on this relationship.

On the other hand, the azimuth angle $\varphi$ is calculated by performing the following process for each pixel. The normal calculation unit 125 calculates the angle $\theta_{max}$ at which the luminance value is maximized in the cosine curve approximated in the process of calculating the polarized image 114. This angle $\theta_{max}$ represents the polarization direction in which the amount of received linearly polarized light is maximized. This angle $\theta_{max}$ is calculated as $b_m$ in the equation (1).

The azimuth angle $\varphi$ is either the calculated angle $\theta_{max}$ or the angle obtained by adding 180° to this angle $\theta_{max}$. The normal calculation unit 125 specifies one of $\theta_{max}$ and ($\theta_{max}$+ 180) as an azimuth angle $\varphi$ by the following procedure based on the normal information obtained from the first depth image 111.

Let z=f (x, y) be the function representing the depth z at the coordinates (x, y). Let the gradient of the first depth at the coordinates (x, y) of the first depth image 111 be (p, q, −1). As illustrated in the following expressions (2-1) and (2-2), p and q are obtained by partially differentiating the first depth at the coordinates (x, y) of the first depth image 111. There is a relationship illustrated in the following expressions (3-1) to (3-3) between the gradient (p, q, −1) and the normal n=($n_x$, $n_y$, $n_z$) at the coordinates (x, y) of the first depth image 111.

$$p = \frac{\delta f}{\delta x} \qquad (2\text{-}1)$$

$$q = \frac{\delta f}{\delta y} \qquad (2\text{-}2)$$

$$n_x = \frac{p}{\sqrt{p^2 + q^2 + 1}} \qquad (3\text{-}1)$$

$$n_y = \frac{q}{\sqrt{p^2 + q^2 + 1}} \qquad (3\text{-}2)$$

$$n_z = \frac{1}{\sqrt{p^2 + q^2 + 1}} \qquad (3\text{-}3)$$

The normal calculation unit 125 calculates the azimuth angle $\varphi'$ at the coordinates (x, y) of the first depth image 111 using the above equations (2-1), (2-2), (3-1) to (3-3). The normal calculation unit 125 specifies the angle closer to the calculated azimuth angle $\varphi'$ among the $\theta_{max}$ and the ($\theta_{max}$+ 180) described above as the azimuth angle $\varphi$ based on the polarized image 114.

In the process of calculating the azimuth angle $\varphi$, the angle of the polarizing filter corresponding to the camera image having the largest luminance value among the three camera images 112a1 to 112c1 may be obtained as the angle $\theta_{max}$ without using the cosine curve approximated as described above.

The normal calculation unit 125 calculates the zenith angle $\theta$ and the azimuth angle $\varphi$ for each pixel according to the above processing procedure. The normal calculation unit 125 generates the normal image 115 by plotting the zenith angle θ and the azimuth angle φ with respect to each pixel on the image, and stores the generated normal image 115 in the storage unit 110.

<Calculation of Detailed Shape>

Figure 10:
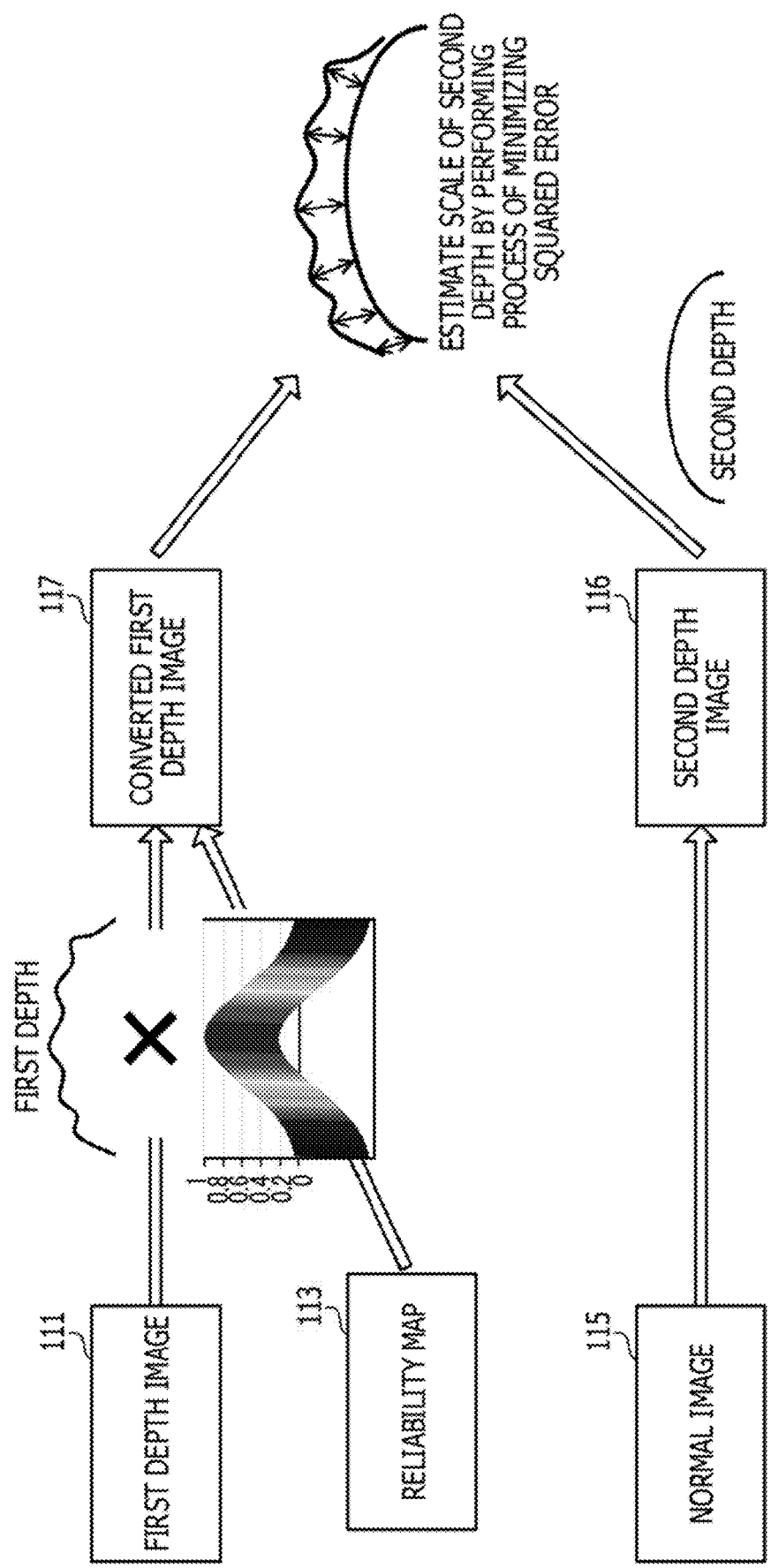
FIG. 10 is a diagram illustrating an outline of a processing procedure of a detailed shape calculation unit.

Next, the processing of the detailed shape calculation unit 126 will be described. FIG. 10 is a diagram illustrating the outline of the processing procedure of the detailed shape calculation unit.

The detailed shape calculation unit 126 multiplies the first depth of each pixel of the first depth image 111 by the reliability of the corresponding pixel included in the reliability map 113. By such multiplication, the first depth image 111 is converted into a converted first depth image 117 illustrated in FIG. 10.

The detailed shape calculation unit 126 estimates the depth (second depth) for each pixel of the normal image 115 based on the normal information included in the normal image 115, thereby calculating the second depth image 116. The second depth estimated at this time is an value with a indefinite scale. Therefore, the detailed shape calculation unit 126 performs the process of minimizing the squared error for each pixel between the depth (converted first depth) of the converted first depth image 117 obtained by the above conversion and the second depth of the second depth image 116. In this process, the scale of the second depth is estimated by the least square method based on the magnitude of the converted first depth based on the measurement result of the TOF sensor 210.

Hereinafter, the second depth estimation and the process of minimizing the squared error between the converted first depth and the second depth will be described in detail. The detailed shape calculation unit 126 estimates the second depth of each pixel of the normal image 115 in the following procedure, thereby generating the second depth image 116. The normal line $n'=(n'_x, n'_y, n'_z)$ at the coordinates (x, y) of the normal image 115 is expressed by the following equations (4-1) to (4-3) using the zenithal angle θ and the azimuth angle φ.

$$n'_x = \cos\varphi \sin\theta \quad (4\text{-}1)$$

$$n'_y = \sin\varphi \cos\theta \quad (4\text{-}2)$$

$$n'_z = \cos\theta \quad (4\text{-}3)$$

The normal $n'=(n'_x, n'_y, n'_z)$ is expressed by the following expressions (5-1) to (5-3) where the gradient of the second depth at the coordinates (x, y) of the normal image 115 is (p', q', -1).

$$n'_x = \frac{p'}{\sqrt{p'^2 + q'^2 + 1}} \quad (5\text{-}1)$$

$$n'_y = \frac{q'}{\sqrt{p'^2 + q'^2 + 1}} \quad (5\text{-}2)$$

$$n'_z = \frac{1}{\sqrt{p'^2 + q'^2 + 1}} \quad (5\text{-}3)$$

The detailed shape calculation unit 126 multiplies the normal n' of equations (5-1) to (5-3) by $n'_z$, and calculates P' and q' which are parameters indicating the gradient of the second depth based on the multiplication result and the expressions (4-1) to (4-3). The detailed shape calculation unit 126 calculates the second depth Dp using the following expression (6).

$$z = Dp = (\int p' dx + \int p' dy)/2 \quad (6)$$

In the above estimation of the second depth Dp, the second depth Dp is estimated by utilizing the relationship in which the normal line may be obtained by partially differentiating the gradient of the depth as illustrated by equations (2-1) and (2-2) and by performing line integration based on the normal information obtained from the polarized image 114. The detailed shape calculation unit 126 generates the second depth image 116 by plotting the second depth Dp estimated using expression (6) for each pixel, and stores the generated second depth image 116 in the storage unit 110.

The second depth image 116 is converted from the camera images 112a to 112c. Therefore, unlike the first depth image 111, in the second depth image 116, distortion of the shape of the image caused by the movement of the object 300 does not occur. On the other hand, however, the scale of the second depth Dp estimated from the above equation (6) is indefinite, whereby its absolute value is not determined correctly.

For this reason, the detailed shape calculation unit 126 estimates the scale of the second depth image 116 by performing the process of minimizing the squared error between the first depth of the first depth image 111 and the second depth Dp of the second depth image 116. At this time, the detailed shape calculation unit 126 does not directly use the first depth image 111. As illustrated in FIG. 10, estimation is performed by using the converted first depth image 117 to which the reliability based on the difference between the photographing time and the scan time is applied. As a result, weighting according to the reliability is performed in the process of minimizing the squared error, and the processing accuracy is improved.

The detailed shape calculation unit 126 performs the following process using, for example, the least squares method. The converted first depth in the m-th pixel of the converted first depth image 117 is $Dc_m$, and the second depth in the m-th pixel of the second depth image 116 is $Dp_m$. The weight used for the process of minimizing the squared error is w, and the variable for determining the scale is β. The detailed shape calculation unit 126 calculates the variable β at which the residual sum of squares RSS expressed by the following equation (7) is minimized.

$$RSS = \sum_{j=0}^{m} \{wDc_m - \beta Dp_m\}^2 \quad (7)$$

The detailed shape calculation unit 126 outputs a second depth image to which the estimated scale is applied, for example, $\beta Dp_m$ calculated for each pixel, as a final depth image in which the influence of the distortion of the image shape is reduced. The depth of the final depth image is calculated by applying the variable β to the second depth estimated from the camera images 112a to 112c in which distortion of the shape of the image does not occur even when the object 300 moves. Therefore, it is possible to calculate the depth with high accuracy where the influence of the distortion of the shape of the image is reduced. As a result, even when the object 300 moves, the three-dimensional shape of the object 300 may be measured with high accuracy.

<Flowchart>

Figure 11:
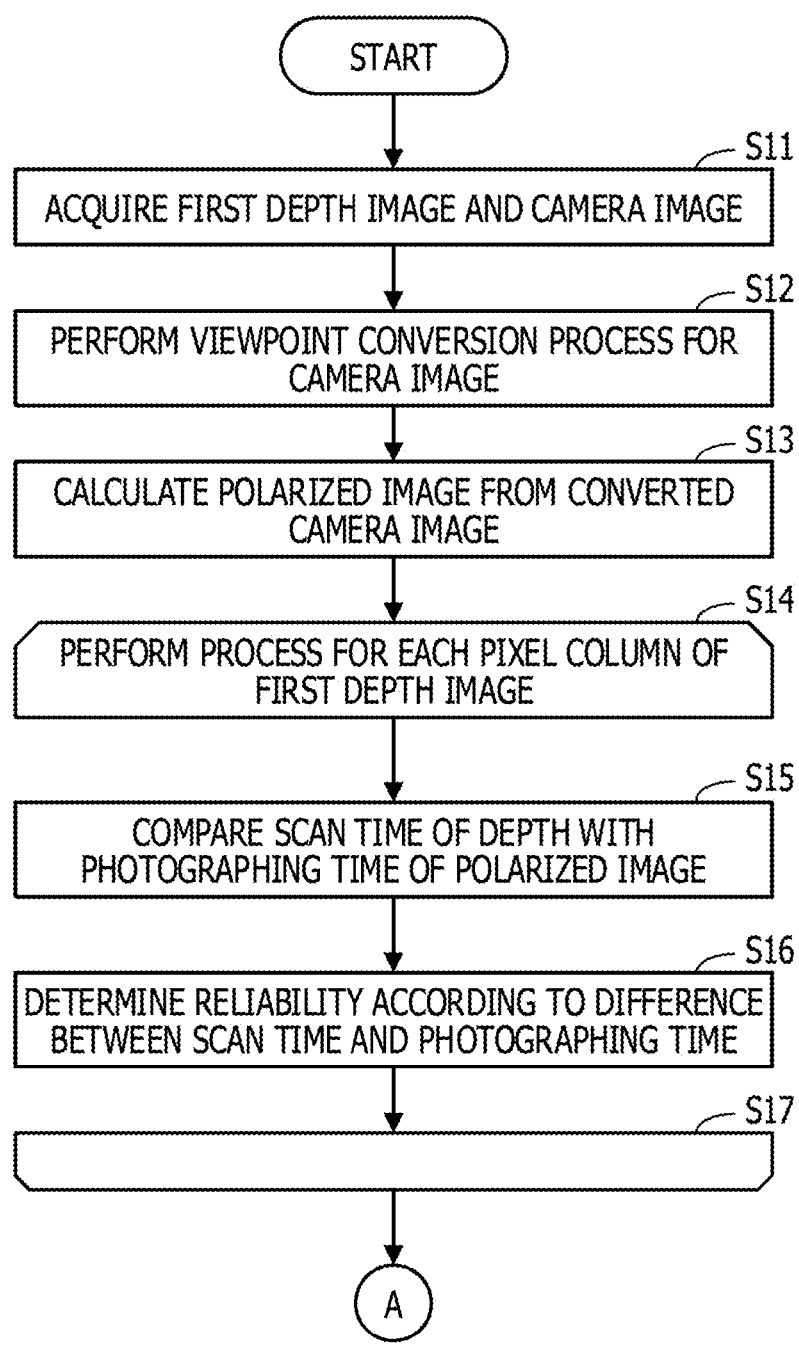
FIG. 11 is a flowchart (part 1) illustrating an example of a processing procedure of the shape measuring device.

Next, the processing procedure of the shape measuring device 100 will be described with reference to a flowchart. FIGS. 11 and 12 are flowcharts illustrating an example of the processing procedure of the shape measuring device.

[Step S11] The first depth acquisition unit 121 acquires the first depth image 111 from the TOF sensor 210, and stores the acquired first depth image 111 in the storage unit 110. The camera image acquisition unit 122 acquires the camera images 112a, 112b, and 112c photographed by the cameras 221, 222, and 223 of the camera unit 220, respectively, and stores the acquired camera images 112a, 112b, and 112c in the storage unit 110.

[Step S12] The polarized image calculation unit 124 performs the viewpoint conversion process for matching the viewpoint to the viewpoint of the first depth image 111 for each of the camera images 112a to 112c. For example, the polarized image calculation unit 124 calculates camera images 112a1, 112b1, and 112c1 by converting the camera images 112a, 112b, and 112c using the homography matrix for the viewpoint conversion.

[Step S13] The polarized image calculation unit 124 calculates the polarized image 114 from the camera images 112a1 to 112c1 converted in step S12. For example, the polarized image calculation unit 124 approximates the luminance value of the m-th pixel in the camera images 112a1 to 112c1 by the cosine curve represented by the above-described expression (1). The polarized image calculation unit 124 obtains the maximum value and the minimum value in the obtained cosine curve, and calculates the degree of polarization of the m-th pixel by the expression of (maximum value/minimum value)/(maximum value+minimum value). The polarized image calculation unit 124 generates the polarized image 114 in which the degree of polarization is plotted for each pixel, and stores the generated polarized image 114 in the storage unit 110.

[Step S14] The reliability calculation unit 123 performs the process of steps S15 and S16 for each pixel column of the first depth image 111. The pixel column is a group of pixels arranged in parallel in a direction orthogonal to the scanning direction of the TOF sensor 210 in the first depth image 111. For example, when the scan direction is horizontal as illustrated in FIG. 7, the pixel columns are a group of pixels arranged in parallel in the vertical direction.

[Step S15] The reliability calculation unit 123 calculates the scan time of the first depth for the pixel column to be processed based on the acquisition time of the first depth image 111. The reliability calculation unit 123 acquires the time of photographing the camera images 112a to 112c, and compares the calculated scan time with the acquired photographing time.

[Step S16] The reliability calculation unit 123 determines the reliability according to the difference between the scan time and the photographing time. The reliability is determined based on a predetermined rule such that the reliability is a value of 0 or more and 1 or less, and the closer the scanning time is to the photographing time, the higher the value of reliability is.

[Step S17] After the process of steps S15 and S16 is performed for all the pixel columns of the first depth image 111, the reliability calculation unit 123 generates the reliability map 113 in which the reliability is plotted for each pixel of the first depth image 111, and stores the generated reliability map 113 in the storage unit 110. The reliability calculation unit 123 advances the process to step S21 in FIG. 12.

[Step S21] The normal calculation unit 125 calculates the zenith angle θ and the azimuth angle φ as normal information for each pixel of the polarized image 114 based on the polarized image 114. For example, the normal calculation unit 125 calculates the zenith angle θ corresponding to the degree of polarization of each pixel of the polarized image 114, for example, based on a predetermined relationship between the degree of polarization and the zenith angle θ as illustrated in the graph 125a in FIG. 9. The azimuth angle φ is calculated as follows.

The normal calculation unit 125 calculates the angle $\theta_{max}$ at which the luminance value is maximized in the cosine curve approximated in the process of calculating the polarized image 114. The normal calculation unit 125 calculates the azimuth angle φ' at the coordinates (x, y) of the first depth image 111 using the above equations (2-1), (2-2), and (3-1) to (3-3). The normal calculation unit 125 specifies the angle closer to the calculated azimuth angle φ' among the $\theta_{max}$ and the ($\theta_{max}$+180) as the azimuth angle φ based on the polarized image 114.

The normal calculation unit 125 generates a normal image 115 by plotting the zenith angle θ and the azimuth angle φ with respect to each pixel of the polarized image 114, and stores the generated normal image 115 in the storage unit 110.

[Step S22] The detailed shape calculation unit 126 estimates the second depth of each pixel of the normal image 115 based on the normal image 115. For example, the detailed shape calculation unit 126 multiplies the normal n' of the above-described expressions (5-1) to (5-3) by $n'_z$ and calculates p' and q' which are parameters indicating the gradient of the second depth based on the multiplication result and the above-described equations (4-1) to (4-3). The detailed shape calculation unit 126 calculates the second depth Dp using the following expression (6). The detailed shape calculation unit 126 generates the second depth image 116 by plotting the estimated second depth Dp for each pixel, and stores the generated second depth image 116 in the storage unit 110.

[Step S23] The detailed shape calculation unit 126 multiplies the first depth of each pixel of the first depth image 111 by the reliability of the corresponding pixel included in the reliability map 113. As a result, the first depth image 111 is converted into the converted first depth image 117.

The processes of steps S12 to S17, and S21 to S24 may be changed within the scope in which the process order of steps S12, S13, S21, and S22, and the process order of S14 to S17 and S23 are maintained, and the process order in which step S22 is performed after step S13 is maintained.

[Step S24] The detailed shape calculation unit 126 performs a process of minimizing the squared error between the converted first depth of the converted first depth image 117 generated at step S23 and the second depth Dp of the second depth image 116 generated at step S22. As a result, the detailed shape calculation unit 126 estimates the scale of the second depth image 116. For example, the detailed shape calculation unit 126 calculates the variable β such that the residual sum of squares RSS expressed by the above-mentioned (7) is minimized. The detailed shape calculation unit 126 outputs a second depth image to which the estimated scale is applied, for example, $\beta Dp_m$ calculated for each pixel, as a final depth image in which the influence of the distortion of the image shape is reduced.

The processing functions of the devices (the distance measuring device 1 and the shape measuring device 100) illustrated in each of the above embodiments may be implemented by a computer. In this case, the above-described processing function is implemented in the computer by providing a program describing processing contents of the function which each device has and executing the program with the computer. The program describing the processing contents may be recorded in a computer readable recording medium. The computer readable recording medium includes a magnetic storage device, an optical disk, a magneto-optical recording medium, a semiconductor memory, and so forth. The magnetic memory device includes a hard disk device (HDD), a flexible disk (FD), a magnetic tape, and the like. The optical disk includes a digital versatile disc (DVD), a DVD-RAM, a compact disc-read only memory (CD-ROM), a CD-recordable (R)/rewritable (RW), and the like.

When the program is distributed, for example, a portable recording medium, such as a DVD and a CD-ROM, in which the program is recorded may be sold. The program may be stored in a storage device of a server computer and the program may be transmitted from the server computer to another computer via a network.

The computer executing the program stores the program recorded in the portable recording medium or the program transmitted from the server computer in a storage device thereof. The computer reads the program from the storage device thereof and executes processing according to the program. The computer may directly read the program from the portable recording medium and execute processing according to the program. The computer may execute the processing according to the sequentially received programs whenever the program is transmitted from the server computer coupled via the network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A distance measuring device comprising:
   a memory configured to store a first distance image acquired from a time of flight (TOF) sensor and a polarized image generated by calculating a degree of polarization for each pixel based on a plurality of images acquired from a plurality of cameras that receives linearly polarized light with different polarization directions; and
   a processor coupled to the memory and configured to
   execute a reliability acquisition process that includes calculating reliability according to a difference between a time of measuring a distance and a time of photographing the plurality of images for each pixel of the first distance image, and
   execute a distance acquisition process that includes calculating an output value of a distance from the TOF sensor to a subject for each pixel by using a second distance image calculated by weighting the reliability to a distance of each pixel of the first distance image, and a third distance image calculated by estimating a distance of each pixel based on the polarized image.

2. The distance measuring device according to claim 1, wherein the reliability acquisition process is configured to set the higher value as the reliability the smaller the difference between the measured time and the photographing time is.

3. The distance measuring device according to claim 1, wherein the distance acquisition process is configured to estimate a scale of a distance of each pixel of the third distance image by performing a process of minimizing the squared error between the second distance image and the third distance image, and
   calculate the output value by converting the third distance image using the estimated scale.

4. The distance measuring device according to claim 3, wherein the distance acquisition process is configured to calculate a variable at which an error between a distance of each pixel of the second distance image, and a value obtained by multiplying a distance of each pixel of the third distance image by the variable for estimating the scale is minimized, and
   calculate a value obtained by multiplying the distance of each pixel of the third distance image by the variable as the output value.

5. The distance measuring device according to claim 1, wherein the processor is further configured to
   calculate a normal image with which normal information is associated for each pixel based on the polarized image, and
   calculate the third distance image based on the normal image.

6. The distance measuring device according to claim 1, further comprising:
   the TOF sensor,
   wherein the TOF sensor emits a light beam for distance measurement as an irradiation pattern extending in a predetermined first direction, and receives reflected light of the light beam while sequentially moving the irradiation pattern in a second direction orthogonal to the first direction to generate the first distance image.

7. A distance measuring method comprising:
   obtaining a first distance image acquired from a time of flight (TOF) sensor and a polarized image generated by calculating a degree of polarization for each pixel based on a plurality of images acquired from a plurality of cameras that receives linearly polarized light with different polarization directions; and
   executing a reliability acquisition process that includes calculating reliability according to a difference between a time of measuring a distance and a time of photographing the plurality of images for each pixel of the first distance image, and
   executing a distance acquisition process that includes calculating an output value of a distance from the TOF sensor to a subject for each pixel by using a second distance image calculated by weighting the reliability to a distance of each pixel of the first distance image, and a third distance image calculated by estimating a distance of each pixel based on the polarized image.

8. The distance measuring method according to claim 7, wherein the reliability acquisition process is configured to set the higher value as the reliability the smaller the difference between the measured time and the photographing time is.

9. The distance measuring method according to claim 7, wherein the distance acquisition process is configured to estimate a scale of a distance of each pixel of the third distance image by performing a process of minimizing the squared error between the second distance image and the third distance image, and calculate the output value by converting the third distance image using the estimated scale.

10. The distance measuring method according to claim 9, wherein the distance acquisition process is configured to calculate a variable at which an error between a distance of each pixel of the second distance image, and a value obtained by multiplying a distance of each pixel of the third distance image by the variable for estimating the scale is minimized, and calculate a value obtained by multiplying the distance of each pixel of the third distance image by the variable as the output value.

11. The distance measuring method according to claim 7, wherein the processor is further configured to calculate a normal image with which normal information is associated for each pixel based on the polarized image, and calculate the third distance image based on the normal image.

12. The distance measuring method according to claim 7, further comprising:

by the TOF sensor, emitting a light beam for distance measurement as an irradiation pattern extending in a predetermined first direction, and receiving reflected light of the light beam while sequentially moving the irradiation pattern in a second direction orthogonal to the first direction to generate the first distance image.

13. A non-transitory computer-readable storage medium for storing a program which causes a processor to perform processing for distance measuring, the processing comprising:

obtaining a first distance image acquired from a time of flight (TOF) sensor and a polarized image generated by calculating a degree of polarization for each pixel based on a plurality of images acquired from a plurality of cameras that receives linearly polarized light with different polarization directions; and executing a reliability acquisition process that includes calculating reliability according to a difference between a time of measuring a distance and a time of photographing the plurality of images for each pixel of the first distance image, and executing a distance acquisition process that includes calculating an output value of a distance from the TOF sensor to a subject for each pixel by using a second distance image calculated by weighting the reliability to a distance of each pixel of the first distance image, and a third distance image calculated by estimating a distance of each pixel based on the polarized image.

14. The non-transitory computer-readable storage medium according to claim 13, wherein the reliability acquisition process is configured to set the higher value as the reliability the smaller the difference between the measured time and the photographing time is.

15. The non-transitory computer-readable storage medium according to claim 13, wherein the distance acquisition process is configured to estimate a scale of a distance of each pixel of the third distance image by performing a process of minimizing the squared error between the second distance image and the third distance image, and calculate the output value by converting the third distance image using the estimated scale.

16. The non-transitory computer-readable storage medium according to claim 15, wherein the distance acquisition process is configured to calculate a variable at which an error between a distance of each pixel of the second distance image, and a value obtained by multiplying a distance of each pixel of the third distance image by the variable for estimating the scale is minimized, and calculate a value obtained by multiplying the distance of each pixel of the third distance image by the variable as the output value.

17. The non-transitory computer-readable storage medium according to claim 13, wherein the processor is further configured to calculate a normal image with which normal information is associated for each pixel based on the polarized image, and calculate the third distance image based on the normal image.

18. The non-transitory computer-readable storage medium according to claim 13, further comprising:

by the TOF sensor, emitting a light beam for distance measurement as an irradiation pattern extending in a predetermined first direction, and receiving reflected light of the light beam while sequentially moving the irradiation pattern in a second direction orthogonal to the first direction to generate the first distance image.

* * * * *